(12) United States Patent
Leasure

(10) Patent No.: US 10,232,760 B2
(45) Date of Patent: Mar. 19, 2019

(54) APPARATUSES, WATERCRAFT SUPPORTS, AND METHODS THEREFOR

(71) Applicant: Clifford Leasure, Chesterton, IN (US)

(72) Inventor: Clifford Leasure, Chesterton, IN (US)

(73) Assignee: Clifford Leasure, Chesterton, IN (US)

( * ) Notice: Subject to any disclaimer, the term of this patent is extended or adjusted under 35 U.S.C. 154(b) by 14 days.

(21) Appl. No.: 15/490,474

(22) Filed: Apr. 18, 2017

(65) Prior Publication Data

US 2018/0118080 A1 May 3, 2018

Related U.S. Application Data

(60) Provisional application No. 62/413,489, filed on Oct. 27, 2016.

(51) Int. Cl.
*B60P 3/10* (2006.01)
*B60P 7/06* (2006.01)

(52) U.S. Cl.
CPC ........... *B60P 3/1075* (2013.01); *B60P 3/1058* (2013.01); *B60P 7/06* (2013.01)

(58) Field of Classification Search
CPC ............................. B60P 3/1075; B60P 3/1058
USPC ...................................... 280/414.1
See application file for complete search history.

(56) References Cited

U.S. PATENT DOCUMENTS

| 3,608,754 | A | * | 9/1971 | Park | B60P 3/1033 |
| | | | | | 114/344 |
| 4,395,185 | A | | 7/1983 | Whaley | |
| 4,623,161 | A | | 11/1986 | Spraygue | |
| 4,858,943 | A | * | 8/1989 | Cote | B60P 3/1075 |
| | | | | | 280/414.1 |
| 5,013,206 | A | | 5/1991 | Ernst et al. | |
| 5,228,713 | A | | 7/1993 | Kovach | |
| 5,332,249 | A | | 7/1994 | Solberg et al. | |
| 5,544,611 | A | | 8/1996 | Fahringer et al. | |
| 6,616,166 | B2 | | 9/2003 | Marchese | |
| 7,267,071 | B2 | | 9/2007 | Brown | |
| 7,455,310 | B2 | | 11/2008 | Hyslop | |
| 8,006,995 | B2 | | 8/2011 | Caudill | |

* cited by examiner

*Primary Examiner* — Tony H Winner
(74) *Attorney, Agent, or Firm* — Hartman Global IP Law; Gary M. Hartman; Domenica N.S. Hartman

(57) ABSTRACT

Apparatuses, watercraft supports comprising the apparatuses, and methods of loading watercraft on the watercraft supports for promoting centering of a watercraft while loading the watercraft onto a watercraft support. The apparatuses include at least two units each having a rigid arm having first and second ends and a barrier component configured to float on water. The first end of the rigid arm is configured to be secured to a watercraft support such that the rigid arm pivots relative to the watercraft support. The second end of the rigid arm is configured to be secured to the barrier component such that the rigid arm pivots relative to the barrier component. The units may be located adjacent to oppositely-disposed longitudinal sides of the watercraft support and used to directing the watercraft to be centered over the watercraft support during loading from a body of water.

20 Claims, 9 Drawing Sheets

APPARATUSES, WATERCRAFT SUPPORTS, AND METHODS THEREFOR

CROSS REFERENCE TO RELATED APPLICATIONS

This application claims the benefit of U.S. Provisional Application No. 62/413,489, filed Oct. 27, 2016, the contents of which are incorporated herein by reference.

BACKGROUND OF THE INVENTION

The present invention generally relates to watercraft trailers, lifts, docks, and other apparatuses intended to remove watercraft from a body of water (collectively referred to herein as watercraft supports). The invention particularly relates to flotation devices for aligning a watercraft on a watercraft support when loading the watercraft on the watercraft support.

Boats are typically removed from a body of water and transported over land with the use of a boat trailer attached to a motor vehicle. In general, an operator locates and submerges at least a portion of the trailer in the body of water such that the boat may be maneuvered over the submerged portions of the trailer. Once the boat is centered and secured to the trailer, the trailer may be removed from the body of water with the boat supported thereon, generally on laterally-spaced stabilizing surfaces such as cushioned bunk boards or rollers (collectively referred to herein as bunk boards).

During the above-noted loading process, operators may experience difficulties when attempting to center the boat over the trailer. For example, the boat may drift during the loading process and come to rest on the trailer in an unaligned, off-centered position, and removal and subsequent reloading becomes necessary.

In addition, bunk boards are commonly secured to the trailer with a fixed height and width and therefore require a prescribed submersion depth of the trailer in order to properly load a boat on the trailer. Since the prescribed submersion depth of the trailer generally provides for only a portion of the trailer being in the water, an operator may have to winch the boat onto the trailer thereby dragging it on the bunk boards. This dragging may damage the bunk boards and/or scratch the bottom surface of the boat. Further, since the bunk boards are in a fixed position and wider than the boat, they may only keep the boat close to the center of the trailer during loading, rather than centered on the trailer, and therefore may not effectively direct the boat into a centered position. Due to the above-noted difficulties, the loading process may require an additional person to hold the boat manually while the operator positions the boat over the trailer to ensure that it is centered.

In addition to or as an alternative to winching the boat onto the trailer, an operator may attempt to navigate the boat at a relatively high speed toward the trailer such that the boat has sufficient momentum to force its way onto the trailer. This maneuver is referred to herein as power loading. While power loading the boat onto the trailer may be easier and faster than using a winch, it also may cause damage to the boat and/or bunk boards. Further, power loading may cause environmental damage to surrounding areas, for example, by disturbing the bottom of the loading area due to propeller wash or disturbing surrounding shorelines due to wake. Consequently, power loading may be prohibited and therefore not an option.

In view of the above, it can be appreciated that there are certain problems, shortcomings or disadvantages associated with the prior art, and that it would be desirable if a method or system were available for efficiently centering a boat relative to a boat trailer during the process of loading the boat on the trailer.

BRIEF DESCRIPTION OF THE INVENTION

The present invention provides apparatuses, watercraft supports (for example, trailers, lifts, docks, etc.), and methods of loading watercraft supports suitable for promoting centering of a watercraft (for example, a boat) while loading the watercraft onto a watercraft support.

According to one aspect of the invention, an apparatus for installation on a watercraft support is provided that includes at least two units each having a rigid arm having first and second ends, means for securing the first end of the rigid arm to the watercraft support such that the rigid arm pivots relative to the watercraft support, a barrier component configured to float on water, and means for securing the second end of the rigid arm to the barrier component such that the rigid arm pivots relative to the barrier component.

According to another aspect of the invention, a watercraft support having a longitudinal direction between a front and rear of the watercraft support and a lateral direction between oppositely-disposed longitudinal sides of the support and perpendicular to the longitudinal direction is provided that includes at least first and second units located adjacent to the longitudinal sides of the watercraft support. Each unit has a rigid arm with first and second ends and a barrier component configured to float on water. The first end of the rigid arm is secured to the watercraft support such that the rigid arm pivots relative to the watercraft support, and the second end of the rigid arm is secured to the barrier component such that the rigid arm pivots relative to the barrier component.

According to another aspect of the invention, a method is provided for loading a watercraft from a body of water onto a watercraft support having at least first and second units each comprising a rigid arm having first and second ends. The first end of the rigid arm is secured to the watercraft support such that the rigid arm pivots relative to the watercraft support, and the second end of the rigid arm secured to a barrier component such that the rigid arm pivots relative to the barrier component. The method includes submerging at least a portion of the watercraft support below the surface of the body of water such that the barrier components of the units float on the surface and cause the rigid arms thereof to pivot upward relative to the watercraft support, moving the watercraft between the barrier components and over the watercraft support such that sides of the watercraft contact at least one of the barrier components, moving the watercraft further over the watercraft support, the barrier components directing the watercraft to be centered over the watercraft support, and then emerging the watercraft support from the body of water with the watercraft supported on the watercraft support.

Technical effects of the apparatus, watercraft support, and method described above preferably include the ability to promote centering of the watercraft over the support during the loading process.

Other aspects and advantages of this invention will be further appreciated from the following detailed description.

BRIEF DESCRIPTION OF THE DRAWINGS

FIG. 10 schematically represents an isolated view of a connection of the components of FIGS. 9 and 10.

DETAILED DESCRIPTION OF THE INVENTION

Figure 1:
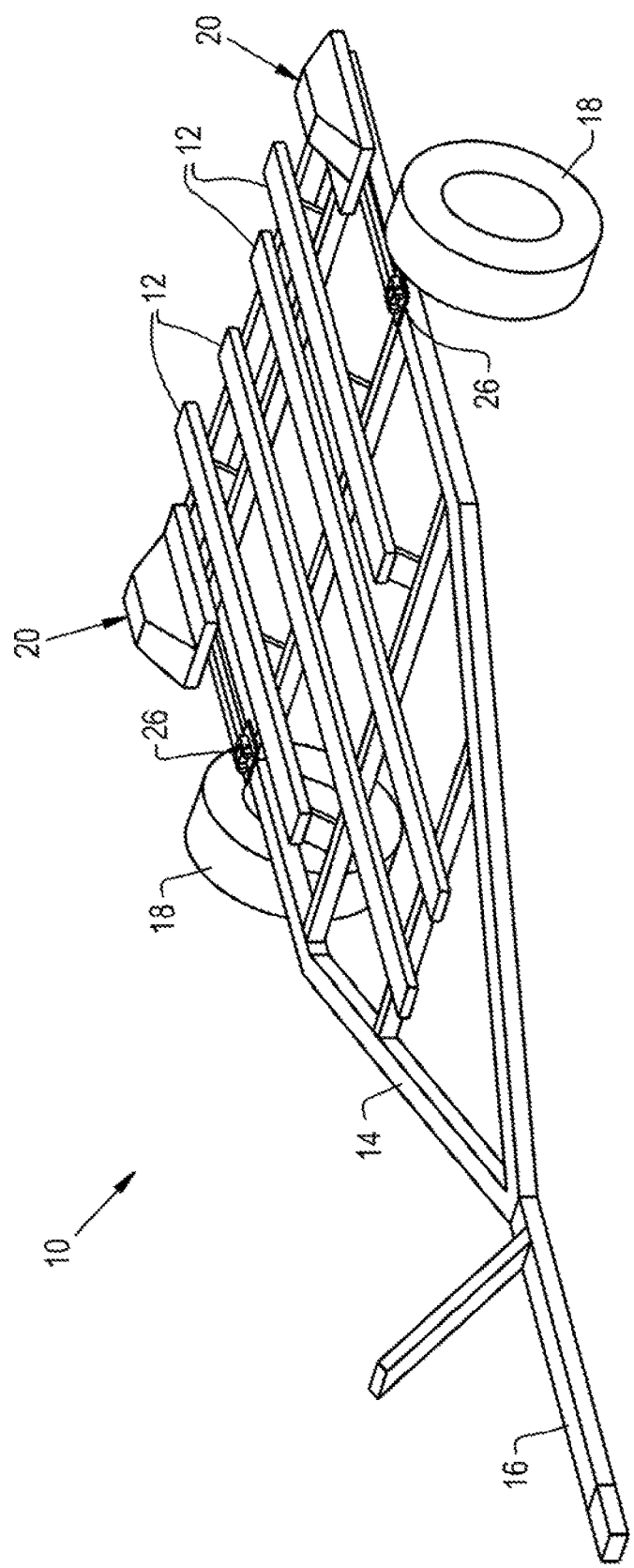
FIGS. 1 and 2 schematically represent a boat trailer having units of an apparatus installed thereon that is adapted to promote centering of a boat while loading the boat onto the boat trailer in accordance with a nonlimiting embodiment of this invention. The units are represented in a stowed position.

FIGS. 1 through 5 schematically represent a nonlimiting boat trailer 10 comprising two units 20 of an apparatus intended to assist in alignment or centering of a boat (or another type of watercraft) while loading the boat onto the trailer 10. Although the invention is described in reference to the boat trailer 10, it is foreseeable and within the scope of the invention that the units 20 of the apparatus may be used on other apparatuses configured to remove watercraft from a body of water, nonlimiting examples including lifts and docks having such capabilities. For example, docks, especially salt water docks, often include means for lifting the watercraft out of the water and supporting it in a suspended or elevated position thereabove. Trailers, lifts, docks, etc. capable of removing a watercraft from a body of water are collectively referred to herein as watercraft supports. For the purpose of disclosing the invention, the trailer 10 will be described herein as having a longitudinal direction between a front and rear of the boat trailer and a lateral direction between longitudinal sides of the trailer and perpendicular to the longitudinal direction. As is conventional in the art, the trailer 10 includes a frame 14, a hitch 16 for coupling to a towing vehicle (not shown), a pair of wheels 18, a bow support (optional winch not shown), and bunk boards 12.

Figure 2:
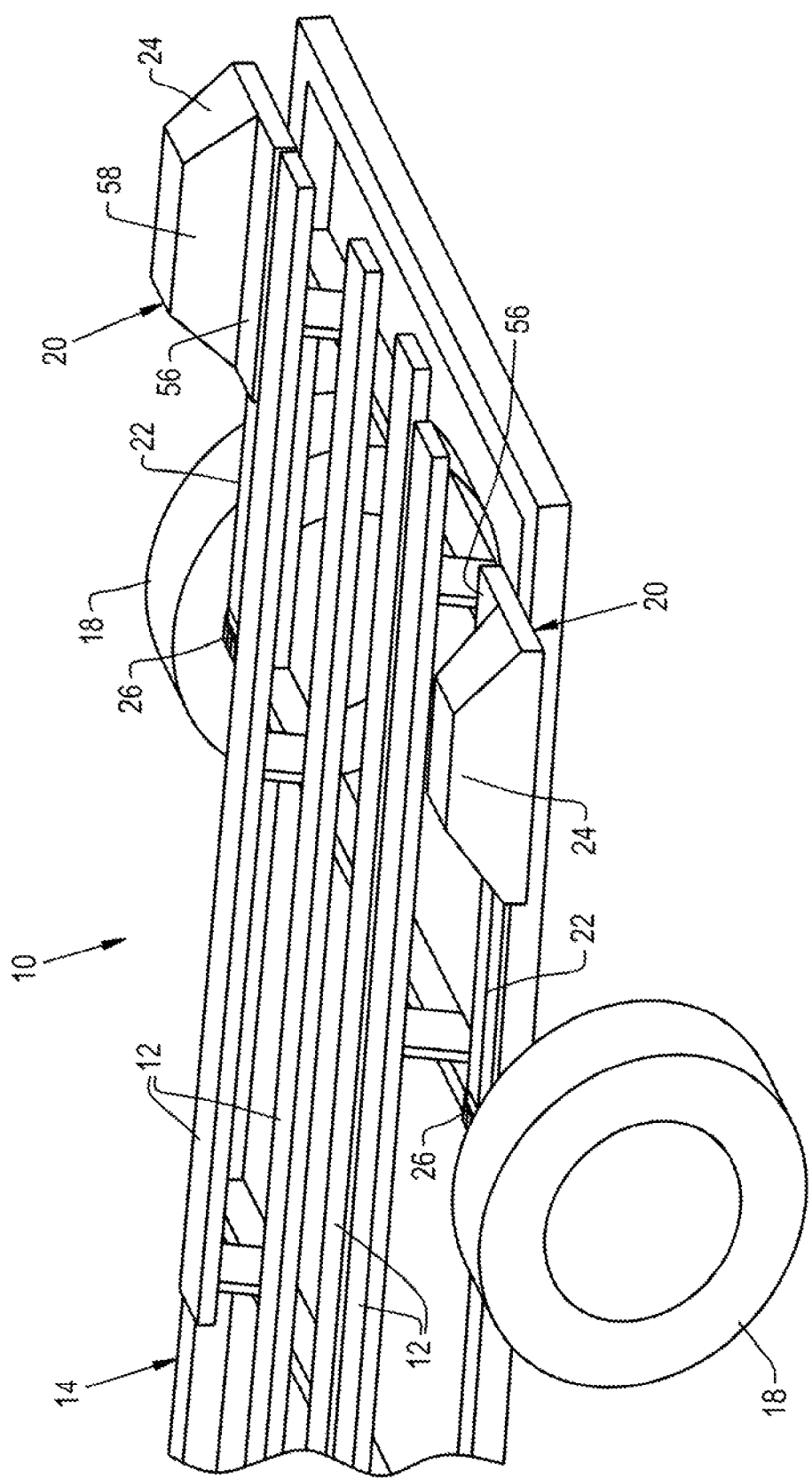
Figure 5:
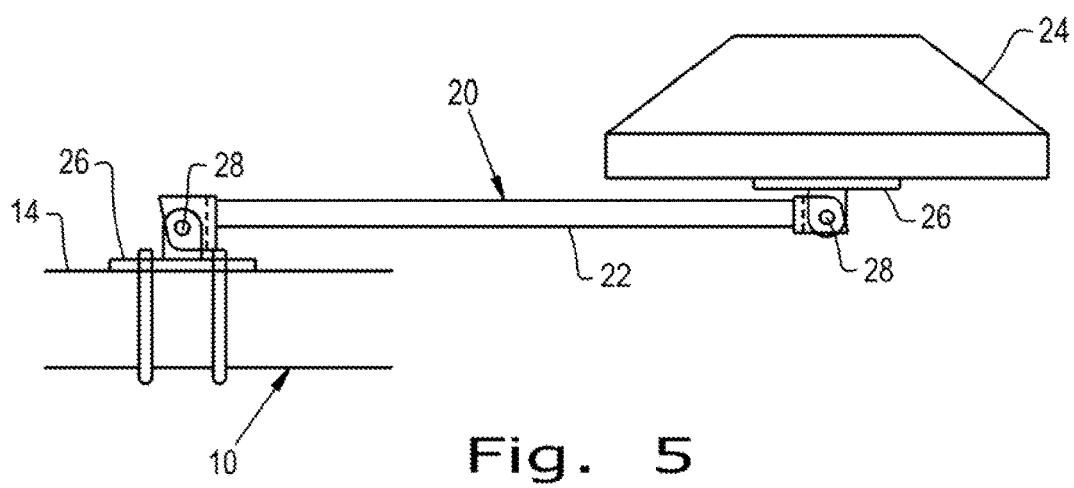
Figure 11:
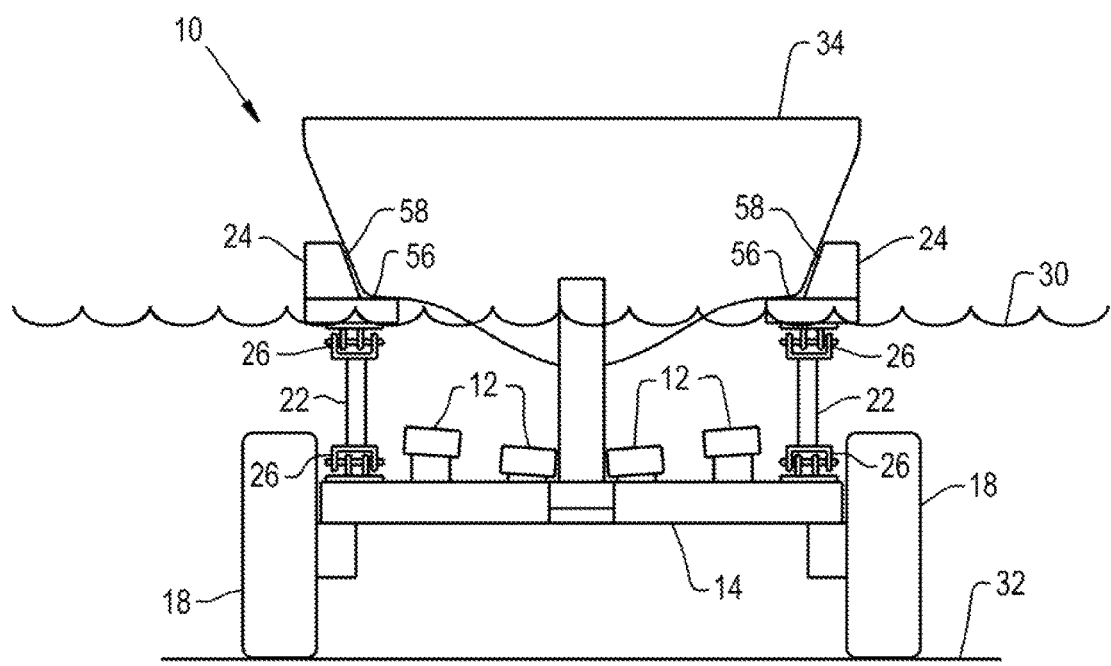
FIG. 11 schematically represents a front view of the boat trailer of FIGS. 1 though 3 as submerged underwater with the units of the apparatus in a deployed position and cradling a boat in accordance with a nonlimiting aspect of this invention.

The units 20 are installed along oppositely-disposed lateral (longitudinal) sides of the trailer in a substantially mirror fashion. As represented by the unit 20 depicted in FIGS. 4 and 5, each unit 20 comprises a rigid arm 22 having a first end pivotally secured to a portion of the trailer 10 (in this instance, the frame 14) and a second end pivotally secured to a floatable barrier component, referred to herein as a float 24. When mounted on a trailer, the floats 24 are laterally spaced apart a sufficient distance to accommodate the width of a boat to be loaded on the trailer, both during and after loading. While on land, the units 20 are in a stowed position such as represented in FIGS. 1, 2, and 5, so that each unit 20 extends rearwardly from its pivot connection on the trailer 10 with its float 24 optionally resting on the frame 14 of the trailer 10. When the frame 14 of the trailer 10 is submerged in a body of water during the loading process, the float 24 of each unit 20 causes its respective arm 22 to pivot upward relative to the frame 14 as a result of at least a portion of each float 24 floating on the surface of the water, resulting in the deployed position represented in FIGS. 3, 4, and 11. In their deployed positions, the units 20 extend upwardly from the frame 14, and as an operator loads a boat 34 from the surface 30 of a body of water onto the trailer 10 (FIG. 11), the boat 34 can be steered between the floats 24 toward the trailer 10 and in so doing may contact either or both floats 24, which as seen in FIG. 11 serve to confine the respective sides of the boat 34 to guide and direct the boat 34 during the loading process such that the boat 34 is continuously relatively centered on the trailer 10 as it is being loaded.

Preferably, the first end of the arm 22 is secured to the trailer 10 such that the arm 22 may freely pivot relative to the frame 14 of the trailer 10 in a fore-aft plane that is parallel to the longitudinal direction of the trailer 10, while being prevented or at least having limited ability to pivot relative to the frame 14 in the lateral direction. Likewise, the second end of the arm 22 is preferably secured to the float 24 such that the arm 22 may freely pivot relative to the float 24 in a fore-aft plane but prevented or at least having limited ability to pivot relative to the float 24 in the lateral direction. Such a configuration is intended to allow the floats 24 to float on the water's surface 30 when the frame 14 is submerged, while the floats 24 remain secured to the trailer 10 with limited ability to pivot in the lateral direction thereof. Preferably, since the floats 24 are relatively rigid in the lateral direction of the trailer 10, the floats 24 are able to resist lateral forces resulting from relatively minor impacts from the boat 34 and act as barriers which direct the boat 34 as it passes over the trailer 10, thereby centering or aligning the boat 34 with the trailer 10.

Figure 6:
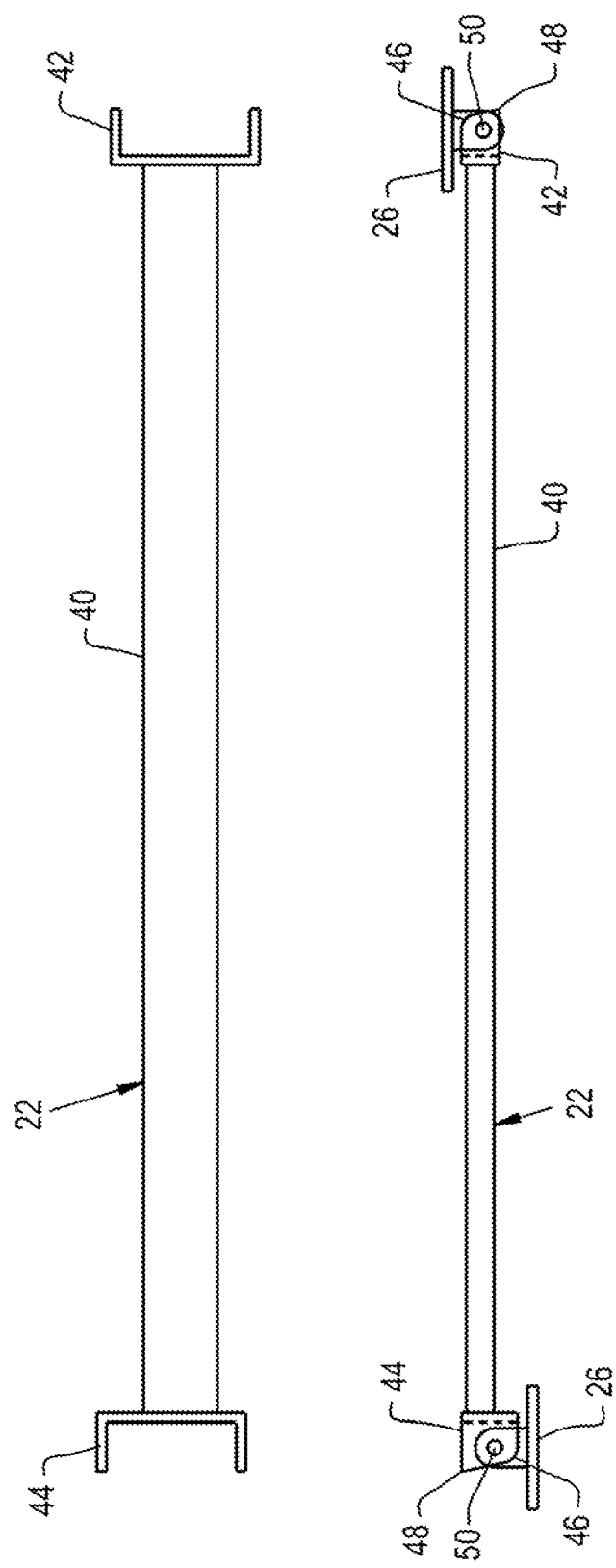
FIGS. 6, 7, and 8 schematically represent multiple views of various components of the unit of FIGS. 1 through 5.
Figure 7:
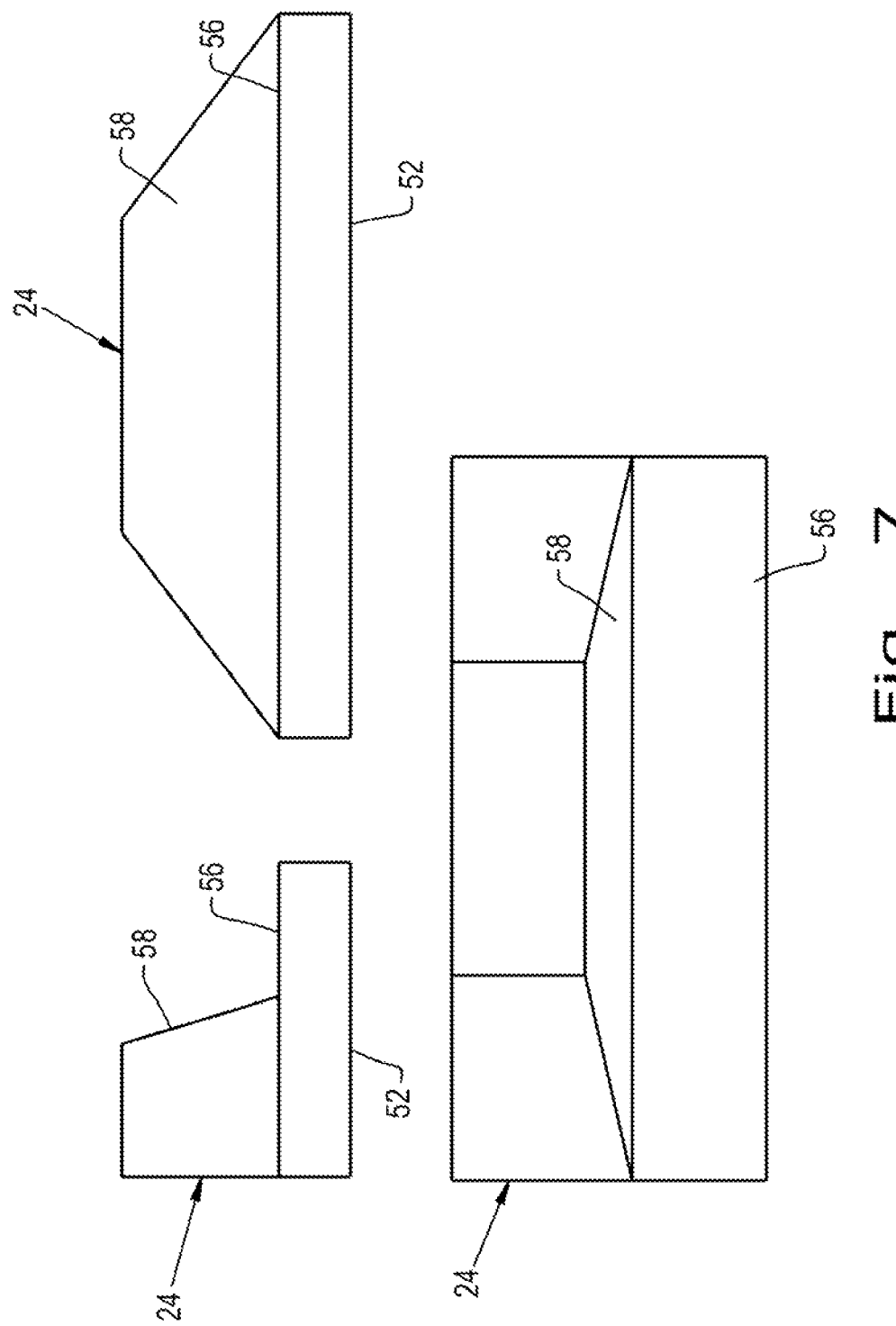
Figure 8:
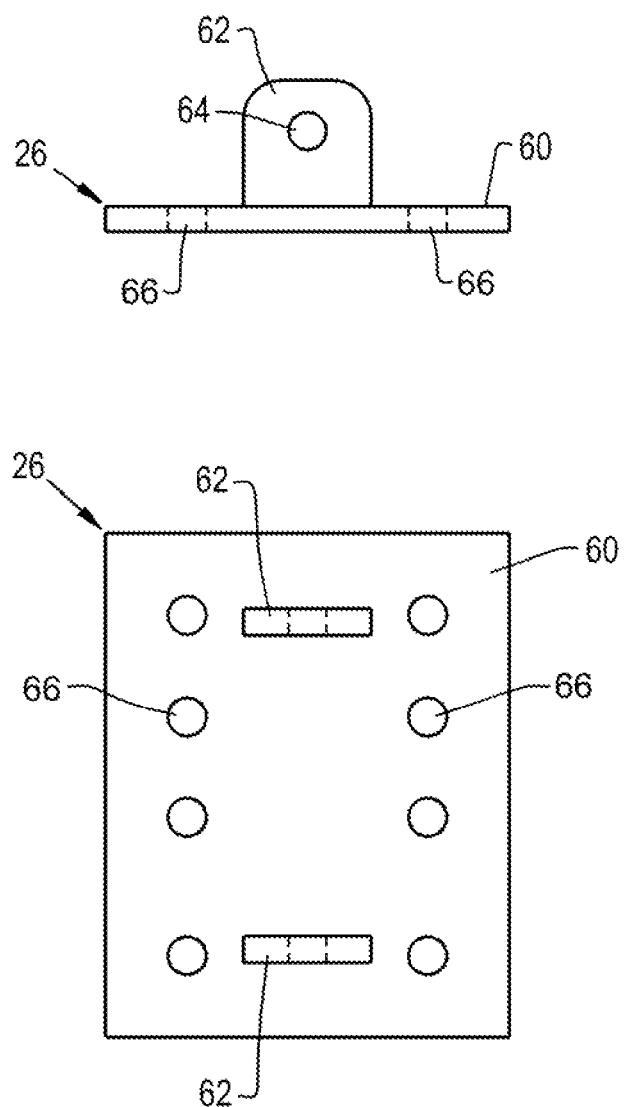

FIGS. 6 through 8 schematically represent isolated views of various components of the units 20 of FIGS. 1 through 5 and 11. It will be appreciated that the components of each unit 20 may have shapes and construction other than those represented, and may be formed of various materials. As such, the components represented in FIGS. 1 though 11 are nonlimiting. Preferably, the floats 24 are formed of or covered with a material that reduces the likelihood of damage to the boat 34 during loading.

In this nonlimiting embodiment, the arm 22 has a generally rectangular body 40 having c-shaped brackets 42 and 44 at oppositely-disposed ends thereof for attachment to the float 24 and frame 14, respectively. The c-shaped brackets 42 and 44 may off-set from center in the longitudinal axis direction of the rectangular body 40 (top image of FIG. 6; top view) to provide installation flexibility and thereby accommodate a wide variety of boat dimensions. For example, two arms 22 may be provided each with the offset in a different direction, and by switching the arms 22 between the sides of the frame 14, the same two arms may be installed at two different widths on the frame 14. Optionally, the c-shaped bracket 44 may be wider than the c-shaped bracket 42 and offset from the rectangular body 40 (bottom image of FIG. 6; side view) to accommodate any other structures than may be pre-existing on the frame 14. For example, various trailers include "U" bolts in this area of the frame holding springs or fenders to the frame. By providing a wider c-shaped bracket 44, the arm 22 may be capable of pivoting into the stowed position while remaining and above any bolts, brackets, or other structures of the frame 14. The brackets 40 and 42 include a rounded, beveled, or chamfered edge 46 on a first side to provide clearance when the arm 22 pivots, and a protruding edge 48 on a second side to limit the angle that the arm 22 may pivot relative to the trailer 10 or float 24. For example, the arm 22 is preferably configured to not pivot past the point of the arm 22 being vertical to ensure that the arm 22 returns to the stowed position, rather than pivoting in the opposite direction which could cause it to contact other portions of the frame 14, such as the fender or wheel well.

The arm 22 may be coupled to the trailer 10 and the float 24 by any means, a nonlimiting example including coupling with intermediate mounting plates 26, nonlimiting examples of which are represented in FIG. 8. Each mounting plate 26 is represented as including a base 60 and a pair of flanges 62 protruding therefrom that have aligned holes 64 formed therethrough that are configured to mate with complementary holes 50 in the c-shaped brackets 42 of the respective arm 22. The mounting plates 26 and arm 22 may be secured together with a pin 28 (FIGS. 4 and 5) such that each arm 22 may pivot relative to its attached mounting plates 26. The mounting plates 26 may be permanently or removably secured to the trailer 10 and the float 24, for example, with fasteners, welding, or other means. FIGS. 1 through 5 and 11 represent the mounting plates 26 at the first end of each arm 22 as secured to an upper surface of the frame 14 and the mounting plates 26 at the opposite second end of each arm 22 secured to a lower end 52 of the corresponding float 24. It is within the scope of the invention that the mounting plates 26 may be coupled to other locations on the trailer 10 and the floats 24. It is also within the scope of the invention that the trailer 10 may include more than two units 20. In FIGS. 1 and 2, the floats 24 of the units 20 are shown as located adjacent to a rear end of the trailer 10 and stowed approximately behind respective wheels 18 of the trailer 10, although this location is not necessarily required.

Figure 3:
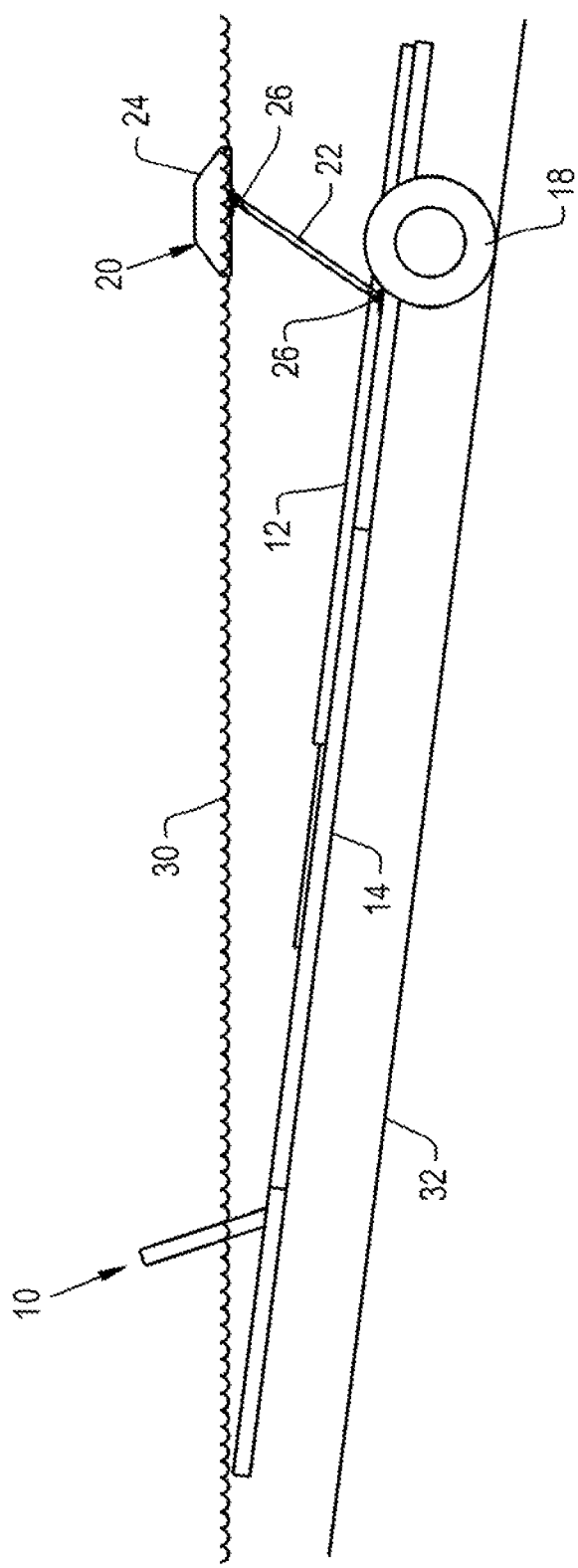
FIG. 3 schematically represents the boat trailer of FIGS. 1 and 2 as submerged underwater with the units of the apparatus in a deployed position.
Figure 4:
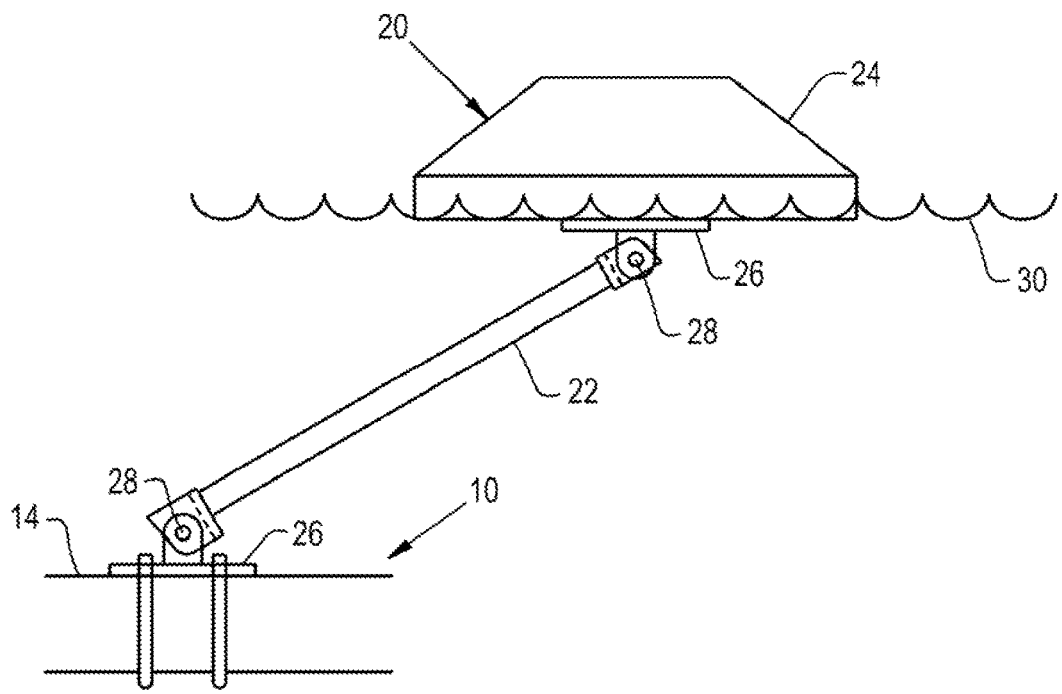
FIGS. 4 and 5 schematically represent isolated views one of the units of FIGS. 1 through 3, shown in deployed and stowed positions, respectively.

According to a nonlimiting embodiment, the trailer 10 may be hitched to a motor vehicle (not shown) for loading of a boat onto the trailer 10. FIG. 3 represents the trailer 10 as directed down a ramp 32 and into a body of water. As the trailer 10 is submerged into the water, the units 20 automatically deploy as a result of their floats 24 rising off the trailer 10 and floating on the surface 30 of the water, coinciding with the arms 22 pivoting upwardly relative to the frame 14 due to the buoyancy of the floats 24. Therefore, even when a majority of the trailer 10 is submerged below the surface 30 of the water, the floats 24 provide an operator with a visual indication of the sides of the trailer 10.

Once the trailer 10 has been adequately submerged in the water, for example, as depicted in FIG. 11, the boat 34 may be loaded thereon. As the operator maneuvers the boat 34 between the floats 24, sides of the boat 34 may contact the floats 24 as represented in FIG. 11. Since the floats 24 resist movement in the lateral direction, the floats 24 preferably act as barriers which direct the boat 34 as it passes over the trailer 10 such that the boat 34 is relatively centered or aligned with the trailer 10. If the boat 34 is significantly off-centered relative to the trailer 10 when directed thereto and strikes one of the floats 24 in the longitudinal direction of the trailer 10, for example, substantially head on, the float 24 preferably is configured to be submerged below the boat 34 due to the weight of the boat 34 to reduce the likelihood of damage to the unit 20 or the boat 34.

Once the boat 34 is between the two units 20, the hull of the boat 34 is preferably in contact with both of the floats 24. More preferably the hull is in direct contact with at least two points, lines, or surface areas on each of the floats 24, for example, on an upper sloped interior surface 58 and a lower interior surface 56 of each of the floats 24, as represented in FIG. 11. In this four-point (or line or surface area) contact orientation, the floats 24 not only act as barriers restricting the lateral movement of the boat 34 relative to the trailer 10, but also function to cradle and hold the boat 34 in a relatively fixed location over the trailer 10. As used herein, the terms cradle and cradling refer to applying forces to the sides and bottom of the boat to maintain a suitable position of the boat 34 relative to the trailer 14 by providing lateral, longitudinal, and elevational support. It is within the scope of the invention that the floats 24 could comprise interior surfaces that conform to the exterior shape of the hull of the boat 34 such that the boat 34 may be cradled with a single large contact area (not shown) of each float 34. Therefore, it should be understood that regardless of the shape of the floats 24, the units 20 are preferably capable of cradling and holding the boat 34 in a position that is relatively centered over the trailer 10.

Once the boat 34 is located over the trailer 10, the vehicle may pull the trailer 10 from the water with the boat 34 supported thereon. As the trailer 10 emerges and is raised above the surface 30 of the water, the arms 22 pivot downwardly relative to the frame 14 such that the units 20 resume their stowed positions and are supported by the trailer 10 (FIGS. 1 and 2). Preferably, the boat 34 is continuously cradled by the floats 24 as the trailer 10 emerges from the water, maintaining the relative location of the boat 34 over the trailer 10 and promoting a centered loading of the boat 34 onto the bunk boards 12.

Once in the stowed position, the interior surfaces 56 and 58 of the floats 24 facing the boat 34 preferably do not contact the hull. For example, the stowed position of the floats 24 may be lower than the bunk boards 12, as represented in FIG. 2. Such a configuration promotes stability of the boat 34 during transportation by ensuring that the boat 34 is entirely supported by the bunk boards 12 and/or other rigid supports of the frame 14, and reduces the likelihood that the units 20 will damage the boat 34, or vice versa, during transportation of the boat 34 with the trailer 10.

By attaching at least one unit 20 to each side of the trailer 10, the units 20 can be used to direct the boat 34 into a centered location over the trailer 10. Such systems and methods allow the operator to submerge the trailer 10 to a depth below the prescribed submersion depth defined by the bunk boards 12. The increased depth of the trailer allows the boat 34 to be located over the trailer 10 without winching or power loading. The arms 22 are preferably of sufficient length to allow the floats 24 to remain at the surface 30 of the water while the trailer 10 is at a sufficient depth to promote centering of the boat 34 over the trailer 10 during the loading process despite any cross wind or current. Pivoting of the individual units 20 is preferably independent, enabling the apparatus to properly function when the trailer 10 is on a surface that is not level in the lateral direction. That is, if one lateral side of the trailer 10 is located at a slightly deeper depth below the surface 30 of the water than the other side of the trailer 10, both floats 24 may still float on the surface 30 of the water at the same level (i.e., one arm 22 may be deployed to a greater angle relative to the frame 14 than the other).

Each unit 20 may be produced as part of a kit which may be installed on an existing boat trailer. For example, referring to the embodiment of FIGS. 1 through 11, each unit 20 may be installed on the trailer 10 by bolting a first mounting plate 26 to the frame 14 of the trailer 10, pinning the arm 22 to the first mounting plate 26 using a pin 28, washer (not shown), and cotter pin (not shown), securing a second mounting plate 26 to the float 24 (for example, with screws), and then pinning the arm 22 to the second mounting plate 26 using a pin 28, washer (not shown), and cotter pin (not shown). If the kit is not configured to match a specific boat size or model, it may be necessary to properly locate the second mounting plate 26 on the float 24 prior to securing the second mounting plate 26 to the float 24.

To accomplish this, the second mounting plate 26 may be first coupled to the arm 22 with the pin 28. While holding the float 24 against a desired location on a side of the boat 34 supported by the bunk boards 12 of the trailer 10, the arm 22 may be pivoted to locate the second mounting plate 26 against the float 24. The float 24 may be marked through fastener holes 66 on the second mounting plate 26. After holes have been formed in the float 24 at the marked locations, the second mounting plate 26 may be removed from the arm 22, if necessary, and then secured to the float 24. Thereafter, the assembled float 24 and second mounting plate 26 may be secured to the arm 22 using the pin 28. The above-noted installation process may be repeated as necessary to install multiple units 20 on the trailer 10. This installation method allows for generic units 20, such as those represented in FIGS. 1-11, to be used on a variety of different trailers and with a variety of different boats.

Figure 9:
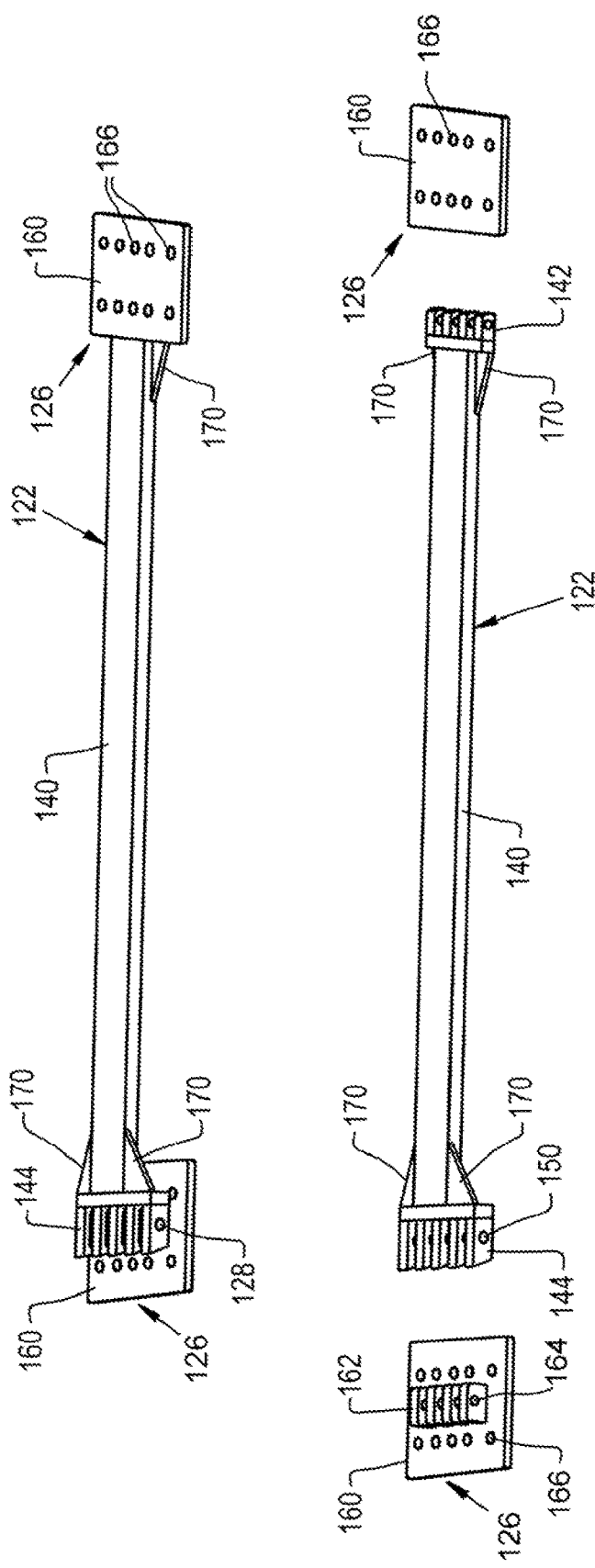
FIGS. 9 and 10 schematically represent alternative embodiments of certain components of the apparatus of FIGS. 1 through 5.
Figure 10:
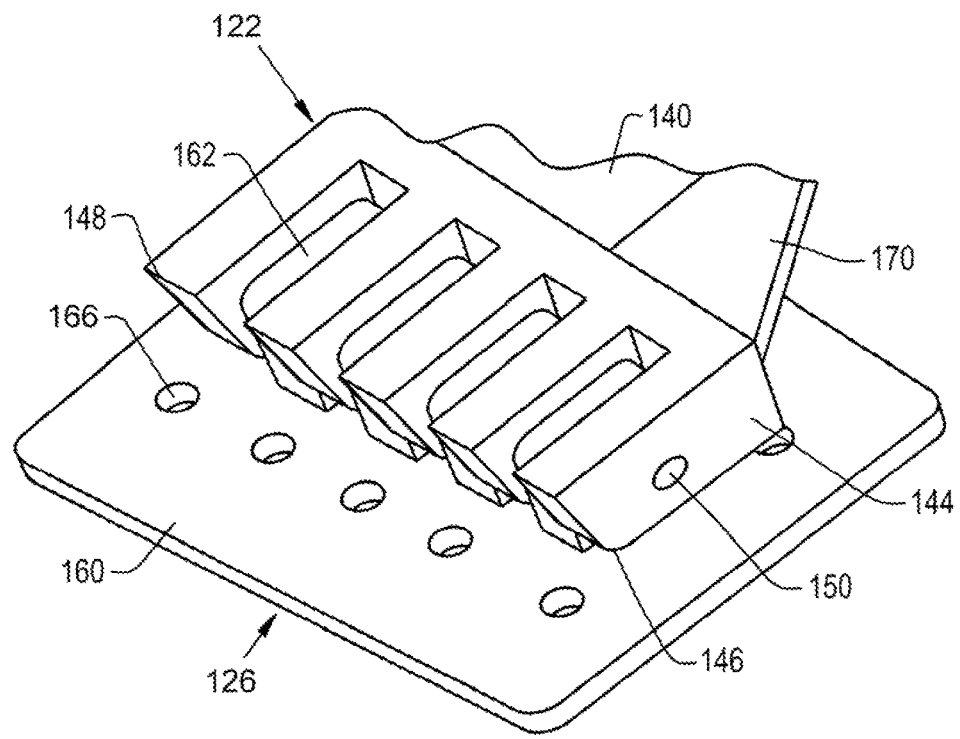

FIGS. 9-11 depict additional configurations of the arms 22 and mounting plates 26 of FIGS. 1-6, 8, and 11 in accordance with a further embodiment of this invention. In these figures, consistent reference numbers are used to identify the same or functionally equivalent elements, but with a numerical prefix (1, 2, or 3, etc.) added to distinguish the particular embodiment from the embodiment of FIGS. 1-6, 8, and 11. In this embodiment, all other components of the apparatus and units 20 not shown in FIGS. 9-11 may be as previously described.

FIGS. 9-11 represent an arm 122 having a generally rectangular body 140 having brackets 142 and 144 at oppositely-disposed ends thereof for attachment to respective mounting plates 126. Each mounting plate 126 is represented as including a base 160 and multiple flanges 162 protruding therefrom that have aligned holes 164 formed therethrough that are configured to mate with complementary holes 150 in the brackets 142 and 144 of the respective arm 122. The mounting plates 126 and arm 122 may be secured together with a pin 128 such that each arm 122 may pivot relative to its attached mounting plates 126 and operate in substantially the same manner as the arm 22 and mounting plates 26 of FIGS. 1-6, 8, and 11. As such, the primary difference from the arm 22 and mounting plate 26 of the previous embodiment is that the arm 122 and mounting 126 include a larger number of connections therebetween (i.e., flanges 162 and corresponding members of brackets 142 and 144). In addition, the arm 122 may include reinforcing members 170 adjacent the body 140 and the brackets 142 and 144 to improve the structural integrity of the arm 122. These difference may allow for the arm 122 to be formed of materials that may not otherwise be strong enough to resist impacts during loading of a watercraft. The brackets 142 and 144 may off-set from center in the longitudinal axis direction of the rectangular body 140 in the same manners as previously described for the c-shaped brackets 42 and 44.

While the invention has been described in terms of a specific or particular embodiment, it should be apparent that alternatives could be adopted by one skilled in the art. For example, the boat 34, the trailer 10, apparatus, and its components could differ in appearance and construction from the embodiment described herein and shown in the drawings, functions of certain components of the apparatus could be performed by components of different construction but capable of a similar (though not necessarily equivalent) function, various materials could be used in the fabrication of the apparatus and/or its components. Accordingly, it should be understood that the invention is not necessarily limited to any embodiment described herein or illustrated in the drawings. It should also be understood that the phraseology and terminology employed above are for the purpose of describing the disclosed embodiment, and do not necessarily serve as limitations to the scope of the invention. Therefore, the scope of the invention is to be limited only by the following claims.

The invention claimed is:

1. An apparatus for loading a watercraft from a body of water onto a watercraft support having a longitudinal direction between a front and rear of the watercraft support and a lateral direction between oppositely-disposed longitudinal sides of the watercraft support and perpendicular to the longitudinal direction, the apparatus having at least two units each comprising:
   a rigid arm having first and second ends;
   means for securing the first end of the rigid arm to the watercraft support such that the rigid arm pivots relative to the watercraft support in a plane parallel to the longitudinal direction and remains rigid relative to the watercraft support in the lateral direction;
   a buoyant barrier component configured to float on water; and
   means for securing the second end of the rigid arm to the barrier component such that the rigid arm pivots relative to the barrier component in a plane parallel to the longitudinal direction and remains rigid relative to the barrier component in the lateral direction.

2. The apparatus of claim 1, wherein each of the barrier components has an upper interior surface and a lower interior surface, the upper interior surface is configured to restrict lateral movement of the watercraft relative to the watercraft support, and in combination the upper and lower interior surfaces are configured to cradle the watercraft by providing lateral, longitudinal, and elevational support thereto.

3. The apparatus of claim 1, wherein the barrier component is configured to have sufficient buoyancy to support a weight of the rigid arm when floating on water such that if one of the units is secured to the watercraft support and the watercraft support is submerged below a surface of the body of water the barrier component floats on the surface of the body of water and causes the rigid arm to pivot upward relative to the watercraft support.

4. The apparatus of claim 1, wherein the barrier components are configured to cradle the watercraft by applying forces to a bottom and oppositely-disposed longitudinal sides of the watercraft while the watercraft is in a position above the watercraft support and the watercraft support is submerged under water.

5. A method of installing each of the units of the apparatus of claim 1 on the watercraft support while the watercraft is located and supported on the watercraft support, the method comprising:
   securing a first mounting plate to the watercraft support;
   pivotally securing the first end of the rigid arm to the first mounting plate
   pivotally securing a second mounting plate to the second end of the rigid arm;
   locating the barrier component against a location on a side of the watercraft;
   pivoting the rigid arm to locate the second mounting plate against the barrier component to identify a position on the barrier component to secure the second mounting plate; and securing the second mounting plate to the barrier component at the position.

6. The method of claim 5, further comprising:
marking the barrier component through holes in the second mounting plate when the second mounting plate is located against the barrier component;
removing the second mounting plate from the rigid arm;
securing the second mounting plate to the barrier component such that the holes in the second mounting plate align with the marks on the barrier component;
pivotally securing the second mounting plate having the barrier component thereon to the rigid arm.

7. A watercraft support for loading a watercraft from a body of water, the watercraft support having a longitudinal direction between a front and rear of the watercraft support and a lateral direction between oppositely-disposed longitudinal sides of the watercraft support and perpendicular to the longitudinal direction, the watercraft support comprising:
at least first and second units located adjacent to the longitudinal sides of the watercraft support, each of the first and second units comprising:
a rigid arm having first and second ends, the first end of the rigid arm secured to the watercraft support such that the rigid arm pivots relative to the watercraft support in a plane parallel to the longitudinal direction and remains rigid relative to the watercraft support in the lateral direction; and
a buoyant barrier component configured to float on water, the second end of the rigid arm secured to the barrier component such that the rigid arm pivots relative to the barrier component in a plane parallel to the longitudinal direction and remains rigid relative to the barrier component in the lateral direction.

8. The watercraft support of claim 7, wherein each of the barrier components has an upper interior surface and a lower interior surface, the upper interior surface is configured to restrict lateral movement of the watercraft relative to the watercraft support, and in combination the upper and lower interior surfaces are configured to cradle the watercraft by providing lateral, longitudinal, and elevational support thereto.

9. The apparatus of claim 7, wherein if the watercraft support is submerged below a surface of the body of water, the barrier components of each of the first and second units are configured to float on the surface of the body of water and cause the rigid arms to pivot relative to the watercraft support in the plane parallel to the longitudinal direction.

10. The watercraft support of claim 7, wherein the barrier components are configured to cradle the watercraft by applying forces to a bottom and oppositely-disposed longitudinal sides of the watercraft while the watercraft is in a position above the watercraft support and the watercraft support is submerged under water.

11. The watercraft support of claim 10, wherein the barrier components are configured to continuously cradle the watercraft above the watercraft support as the watercraft support emerges from the body of water until the watercraft is located and supported on stabilizing surfaces of the watercraft support.

12. The watercraft support of claim 7, wherein when the watercraft support is submerged under water the first and second units are configured to allow the barrier component to be submerged under the water by a weight of the watercraft if the watercraft contacts the barrier component in the longitudinal direction of the watercraft support.

13. The watercraft support of claim 7, wherein when the watercraft support is not submerged underwater and the watercraft is located and supported on stabilizing surfaces of the watercraft support the first and second units are not in contact with the watercraft.

14. The watercraft support of claim 7, wherein each of the first and second units is configured to pivot relative to the watercraft support and the barrier component independently of each other.

15. A method of loading the watercraft from the body of water onto the watercraft support of claim 7, the method comprising:
submerging at least a portion of the watercraft support below the surface of the body of water such that the barrier components of the first and second units float on the surface and cause the rigid arms thereof to pivot upward relative to the watercraft support in the plane parallel to the longitudinal direction;
maneuvering the watercraft between the barrier components and over the watercraft support such that oppositely-disposed longitudinal sides of the watercraft contact one or both of the barrier components;
moving the watercraft further over the watercraft support, the barrier components directing the watercraft to be centered over the watercraft support and cradling the watercraft by applying forces to a bottom and the longitudinal sides of the watercraft; and then
emerging the watercraft support from the body of water with the watercraft supported on the watercraft support.

16. A method of loading a watercraft from a body of water onto a watercraft support having a longitudinal direction between a front and rear of the watercraft support and a lateral direction between oppositely-disposed longitudinal sides of the watercraft support and perpendicular to the longitudinal direction, the watercraft support comprising at least first and second units each comprising a rigid arm having first and second ends, the first end of the rigid arm secured to the watercraft support such that the rigid arm pivots relative to the watercraft support, the second end of the rigid arm secured to a buoyant barrier component such that the rigid arm pivots relative to the barrier component, the method comprising:
submerging at least a portion of the watercraft support below the surface of the body of water such that the barrier components of the first and second units float on the surface, causing each of the barrier components to pivot in a plane parallel to the longitudinal direction but remain rigid relative in the lateral direction, and causing each of the rigid arms thereof to pivot upward relative to the watercraft support in a plane parallel to the longitudinal direction but remain rigid relative to the watercraft support in the lateral direction;
moving the watercraft between the barrier components and over the watercraft support such that oppositely-disposed longitudinal sides of the watercraft contact at least one of the barrier components;
moving the watercraft further over the watercraft support, the barrier components directing the watercraft to be centered over the watercraft support; and then
emerging the watercraft support from the body of water with the watercraft supported on the watercraft support.

17. The method of claim 16, further comprising moving the watercraft over the watercraft support such that the barrier components of the at least first and second units contact and cradle the watercraft by applying forces to the longitudinal sides and a bottom of the watercraft while the watercraft is in a position above the watercraft support.

18. The method of claim 17, wherein the emerging step includes continuously cradling the watercraft above the watercraft support with the barrier components as the watercraft support emerges from the body of water until the watercraft is located and supported on stabilizing surfaces of the watercraft support.

19. The method of claim 16, wherein the watercraft is a boat and the watercraft support is a boat trailer.

20. The method of claim 16, wherein each of the barrier components has an upper interior surface and a lower interior surface, and during the moving of the watercraft the upper interior surface restricts lateral movement of the watercraft relative to the watercraft support and in combination the upper and lower interior surfaces cradle the watercraft by providing lateral, longitudinal, and elevational support thereto.

* * * * *